United States Patent [19]

Krumm et al.

[11] 3,980,452
[45] Sept. 14, 1976

[54] PROCESS FOR SUPPLYING HEAT TO CHEMICAL REACTIONS

[75] Inventors: Hagen Krumm, Frankfurt am Main; Heinz Jockel, Klein-Gerau; Klaus von Walter, Arnoldshain; Kurt Restin; Robert Kühn, both of Berlin, all of Germany

[73] Assignee: Metallgesellschaft Aktiengesellschaft, Frankfurt am Main, Germany

[22] Filed: Nov. 24, 1975

[21] Appl. No.: 634,994

Related U.S. Application Data

[63] Continuation of Ser. No. 504,649, Sept. 9, 1974, abandoned.

[30] Foreign Application Priority Data

Sept. 14, 1973 Germany............................ 2346275

[52] U.S. Cl.............................. 48/215; 48/214 R; 48/197 R
[51] Int. Cl.².......................................... C01B 2/14
[58] Field of Search.............. 48/214, 215, 210, 197

[56] References Cited
UNITED STATES PATENTS
3,787,193   1/1974   Seglin et al...................... 48/210 X

*Primary Examiner*—R.E. Serwin
*Attorney, Agent, or Firm*—Burgess, Dinklage & Sprung

[57] ABSTRACT

Heat is supplied to chemical reactions, especially reactions involving the cracking of hydrocarbons for producing gas, by the combustion of fuels with heated combustion air followed by a heat exchange extraction of sensible heat from the flue gases produced by the combustion for heating air for the combustion. The hot reaction product is at least partly air cooled and the resulting heated cooling air is passed at least partly through the air preheater before the air is used as heated combustion air.

2 Claims, 1 Drawing Figure

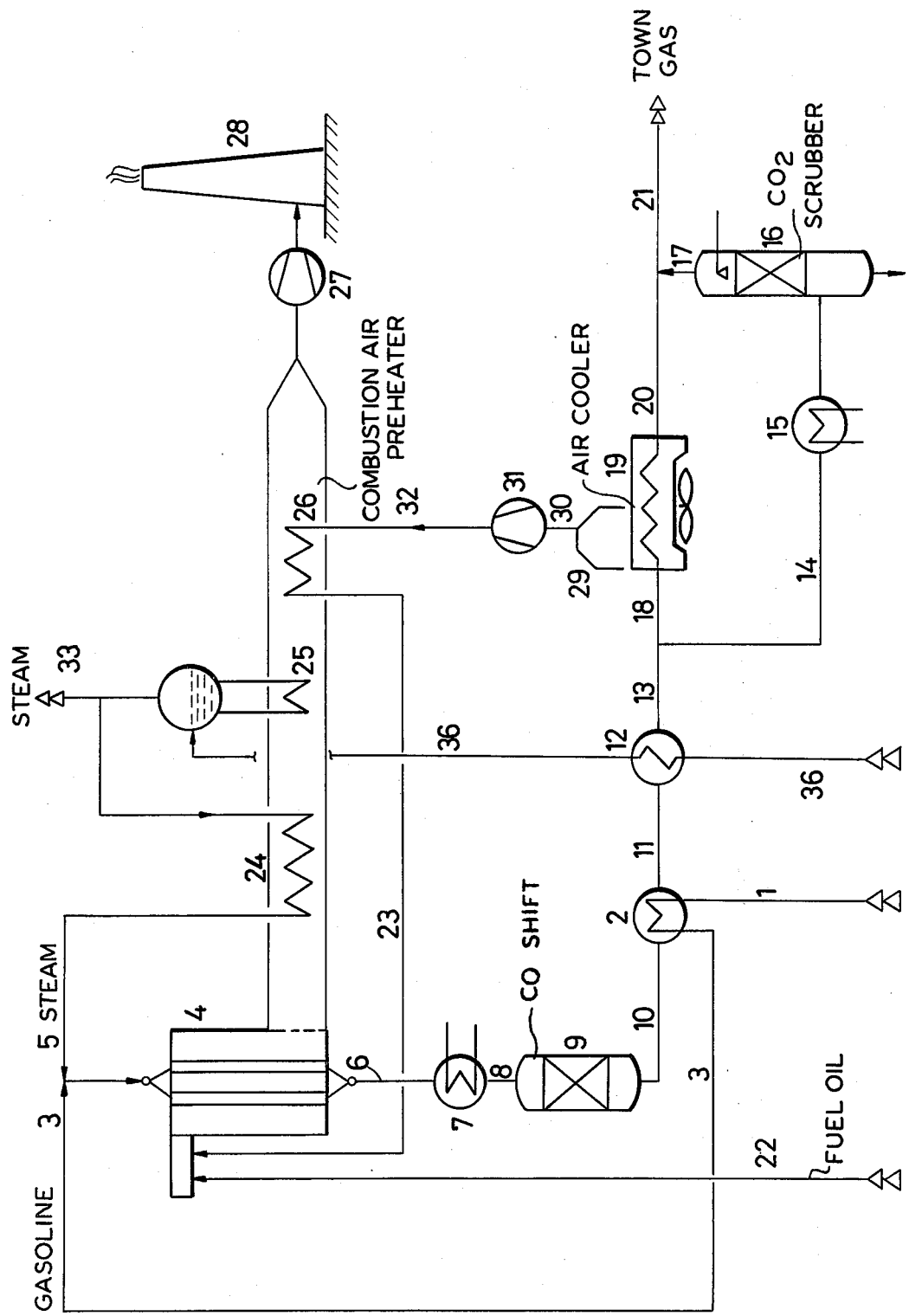

PROCESS FOR SUPPLYING HEAT TO CHEMICAL REACTIONS

This is a continuation of application Ser. No. 504,649, filed Sept. 9, 1974 and now abandoned.

BACKGROUND

This invention relates to a process of supplying heat to chemical reactions, particularly to a cracking of hydrocarbons for producing gas, by a combustion of fuels with heated combustion air and an extraction of sensible heat from the flue gases produced by the combustion, which extraction is carried out in a heat exchanger (air preheater) for heating the air intended for combustion.

When liquid or gaseous fuels are industrially burnt to produce steam or to maintain chemical processes, difficulties always arise because the temperature of the flue gases decreases locally below the dew point, particularly when sulfur-containing fuels are burnt. When sulfur-free fuels are used for heating, the condensation products contain small amounts of carbon dioxide and oxygen and only slightly attack the steel parts of the plant which are contacted by them. A different situation arises when the temperature of flue gases produced by the combustion of sulfur-containing fuels decreases below the dew point. The sulfur contained in the fuel is oxidized by the combustion to $SO_2$ and $SO_3$ and these compounds increase the water vapor dew point. The increase of the dew point depends mainly on the sulfur content of the fuel. Additional factors are the excess of air present during the combustion and the nature of the fuel.

The water vapor dew point of the flue gases produced by the combustion of sulfur-free gasoline is about 50°C, and the dew point of the flue gases produced by the combustion of light fuel oil (EL fuel oil), which contains 0.5 % sulfur, is about 80°–85°C. A dew point of about 160°–180°C must be expected when heavy fuel oil which contains about 4% sulfur is burnt. If the temperature in the flue gas decreases below the dew point, the condensation product will contain sulfurous acid and sulfuric acid in different concentrations and will very strongly attack most metallic materials. Owing to the danger to heat exchangers of steel, exhaust fans and steel chimneys, it is often necessary to feed the flue gases at relatively high temperatures into the exhaust gas chimney so that temperatures below the dew point will be reliably avoided.

In the conventional arrangements of heat extractors in a fired system, the sensible heat, which is at a high temperature, is utilized in most cases for a superheating of steam, for a heating of chemical processes, or for preheating process feedstocks. In some cases, the highest peak temperature peaks are taken up by a steam producer, which is preferably operated in the range above about 250°–300°C. Special consideration will then be required if the sensible heat of the flue gases below said temperatures is to be utilized further. In this connection, the corrosion problem must also be taken into account. If, for this reason, the flue gases are supplied into the exhaust gas chimney at an excessively high temperature, considerable energy will be lost without utilization.

Combustion air preheaters are generally used for a further utilization of the sensible heat of the flue gases. The preheating of the combustion air increases the economy of the fired system. The heat exchangers for preheating the combustion air are made in most cases from steel or cast iron although these are attacked by acids. Whereas cast iron resists concentraded sulfuric acid, it is attacked by an acid of lower concentration. This fact may necessitate the use of glass tubes for protecting parts of the air preheater which are endangered by corrosion. In that case, however, in a tube bank heat exchanger the side where the cold flue gases exit and the side where the cold combustion air enters as well as the flue gas duct leading to the exhaust fan and the fan itself remain endangered.

Hot flue gas and cold combustion air on both sides of a conventional combustion air preheater have approximately the same film coefficient of heat transfer because these two gases under low pressure are caused to flow approximately at the same velocity. As a result, the tube wall temperature in the heat exchanger is approximately midway between the temperatures of the flue gas and the combustion air. Owing to the poor film coefficients of heat transfer, a strict counterflow arrangement or a cross-counterflow arrangement is selected in most cases in order to minimize the dimensions of the heat exchanger and to provide for an air temperature which is as high as possible. If the mean exit temperature of the flue gas is 150°C, and the air entering the heat exchanger is at a temperature of 25°C, a tube wall temperature of about 87°C must be expected in a counterflow arrangement. When EL fuel oil is used, that temperature is still above the dew point of the resulting flue gases. On the other hand, if the entering air is at a temperature of 0°C, the tube wall temperature will be only about 75 °C so that a condensation in the flue gas and consequent corrosion must be expected. As the air temperature decreases, more condensate is formed and the corrosion increases. In heat exchanger providing for a cross-counterflow and fed with flue gases having the same average exit temperature, the local temperature at the air entrance will be lower by as much as 80°C so that temperatures below the dew point must always be expected.

SUMMARY

The invention ensures that the tube wall temperatures in the air preheater lie always above the dew point of the flue gases. This is particularly important in cold winter periods when the outdoor air temperatures are close to or below the freezing point. Besides, an additional supply of energy to the overall plant should not be required. This is accomplished according to the invention in that the hot reaction product is cooled at least in part by air cooling and the resulting heated cooling air is passed at least in part through the air preheater before said air is used as heated combustion air for heating.

DESCRIPTION

As a result of this process measure, only preheated air is fed into the combustion air preheater so that a local cooling of the flue gases below their dew point is avoided there. It will be of special significance that this preheating of air is effected by energy which is present in the process itself and which normally is not utilized. As a result, the use of the process according to the invention improves the overall efficiency. As will be shown hereinafter with reference to an example, the improvement in efficiency is of such order that the equipment required for the process may be usefully installed even when sulfur-free fuels are fired. The advantages of the process reside in that existing equipment can substantially be used for air preheating so that a corrosion by sulfuric acid in the cold part of the air preheater may be prevented and a genuine improvement of the thermal efficiency of the plant is obtained in a surprisingly simple manner.

The heated cooling air is desirably at a temperature of about 50°–120Z°C as it enters the air preheater. The reaction product may be introduced into the air cooler at a temperature of about 80°–170°C. In that case it may be desirable to withdraw the heated cooling air which is intended for the air preheater from the product gas entrance region of the air cooler. The combustion air which is further heated in the air preheater is supplied to the furnace at a temperature of, e.g., 120°–350°C. Even higher temperatures may be used if required.

The process will be explained more fully hereinafter with reference to an example and the drawing. Whereas in that example, reference is made to a plant for producing town gas from liquid hydrocarbons by steam reforming, the concept of the invention may also be applied to other processes.

In a town gas plant, gasoline is supplied through conduit 1 to a preheater and evaporator 2 and then through a conduit 3 to a tubular heater 4. In the latter, the gasoline together with process steam admixed through conduit 5 is converted in externally heated, catalyst-filled tubes into a cracked gas, which contains hydrogen, carbon monoxide, carbon dioxide, methane, and undecomposed water vapor. The gasoline is cracked in a manner known per se. The product gas leaves the tubular heater 4 at about 700°C and in conduit 6 is fed to a waste heat boiler 7 for a first cooling and is then fed in conduit 8 to a carbon monoxide shift conversion unit 9, in which most of the carbon monoxide content is consumed. The gas which then contains CO only in residual amounts is fed in conduit 10 to the gasoline preheater and evaporator 2, where it delivers an additional part of its heat. Gas then flows in conduit 11 into the feed water preheater 12, where the water supplied in conduit 36 is heated.

A small part of the gas is supplied in conduits 13 and 14 to the reboiler 15, in which steam is produced for regenerating the scrubbing solution used in a $CO_2$ scrubber 16. In the latter, the carbon monoxide is scrubbed from this small part of the gas in order to adjust the finished town gas to the required density. The partial stream from which $CO_2$ has been removed is then returned in conduit 17 to the main stream.

After the feed water preheater 12, the main stream of gas is still at a temperature of 140°C and must be cooled. For this purpose the main stream is fed in conduits 13 and 18 to the air-cooled cooler 19, in which the gas is cooled to 30°C. The air used to cool the gas is heated thereby and is at a temperature of 80°C where the gas to be cooled enters the air-cooled cooler. The cooled gas leaves the air-cooled cooler in conduit 20 and is mixed with the $CO_2$-free gas from conduit 17 to form the finished town gas, which leaves the plant in conduit 21.

The cracking process in the tubes of the tubular heater 4 is endothermic and must be maintained by a supply of heat. For this purpose, EL fuel oil and combustion air are supplied to the tubular heater 4 in conduits 22, 23, respectively, and the oil is burnt in the heater. The hot flue gases from the tubular heater deliver in a steam superheater 24 part of their heat of the process steam to be superheated. In addition, process steam and steam for other purposes are produced in a waste heat boiler 25 and the steam for other purposes is discharged in conduit 33. Finally, the flue gases are cooled in a combustion air preheater 26 to 150°C by a heat exchange and are then fed to the chimney 28 by a flue gas blower 27.

The air required to process the fuel oil is sucked above the air cooler 19 in the suction hood 29 and is fed in conduit 30 to the blower 31 and delivered by the latter through conduit 32, the air preheater 26, and the conduit 23, into the tubular heater 4. The air sucked into the hood 29 is at a temperature of 80°C.

The economy of the proceess will be demonstrated hereinafter with reference to two process examples:

EXAMPLE 1

The following supplies are required for the production of town gas having a calorific value of 4,200 kilocalories per standard cubic meter at a rate of 500,000 standard cubic meters per day, if combustion air at 0°C is sucked in known manner from the atmosphere: Process gasoline having a gross calorific value of 11,470 kilocalories per kilogram at a rate of 6,670 kilograms per hour, and, for underfiring, EL fuel oil having a gross calorific value of 10,970 kilocalories per kilogram at a rate of 1,680 kilograms per hour. In view of the above, the plant has the following thermal efficiency:

$$\frac{5000,000 \times 4,200 \times 100}{24 \times (6,670 \times 11,470 + 1,680 \times 10,970)} = 92.17\%$$

flue gases entering the chimney are at a temperature of 150°C. The energies supplied to and withdrawn from the fired system, consisting of the tubular heater 4, the steam superheater 24, the flue gas boiler 25, and the combustion air preheater 26, will now be discussed, related to a temperature of 0°C.

In each kilogram of EL fuel oil at 10°C, 10,265 kilograms are supplied to the system owing to the net calorific value and the sensible heat of the fuel oil. The combustion air at 0°C does not affect the energy balance. The energy loss caused by the removal of 14.8 standard cubic meters of flue gas at 150°C having an enthalpy of 50 kilocalories per standard cubic meter amounts to 740 kilocalories per kilogram. The useful heat which is supplied is calculated as the difference between the two figures and amounts to 9,525 kilocalories per kilogram.

The lowermost flue gas temperature which is measured in the cross-counterflow air preheater at the entrance of the combustion air and amounts to 55°C. Condensation was observed and after some time strong corrosion effects were detected on the flue gas side of the sheet steel housing and the cold tube plate of the combustion air preheater. The corrosion products crushed some of the glass tubes inserted in view of the danger of corrosion. After some time, the corrosion effects in the air preheater were so strong that thorough repairs were required.

EXAMPLE 2

For the second example, a pipeline 30 was installed which led from the near-by air cooler 19 to the suction side of the combustion air blower. Hot air discharged from the top of the air-cooled cooler 19 is sucked in a suction hood 29 and is supplied to the combustion air preheater 26 for a further preheating therein. During the operation of the plant, the sucked combustion air is at 80°C and the temperature of the flue gas at the entrance to the air preheater is controlled to maintain the temperature of the flue gases entering the chimney 28 at 150°C, as in the first case. The lowermost flue gas temperature measured in the air preheater is 110°C and is thus greatly above the dew point of the flue gas, which is at about 83°C. Corrosion is entirely eliminated by the novel process.

In this case the following energies are supplied to and removed from the fired system per kilogram of fuel oil (related to 0°C):

As in Example 1, 10,265 kilocalories of energy are supplied in each kilogram of fuel oil, together with 334 kilocalories per kilogram by a supply of 13.4 standard cubic meters air, which is at 80°C and has an enthalpy of 24.9 kilocalories per standard cubic meter. This supplied energy totals 10,599 kilocalories per kilogram, from which 47 kilocalories per kilogram must be deducted to account for 14.8 standard cubic meters of flue gas at 150°C. The heat supply thus amounts to 9,859 kilocalories per kilogram. As a result of the additional preheating of air to 80°C, the consumption of fuel oil is reduced to $1,680 \times 9,525/9,859 = 1,623$ kilograms per hour. The thermal efficiency of the plant is now $$\frac{500,000 \times 4,200 \times 100}{24(6,670 \times 11,470 + 1,623 \times 10,970)} = 92.78\%$$

Compared to the first example this is an improvement of 0.61 % or a saving of 57 kilograms fuel oil per hour. With 8,000 operating hours per year and a mean load of 70 %, this means a saving of about 320 metric tons per year which at a fuel oil price of about DM 130.00 per metric ton corresponds to about DM 41,600.00 per year. In addition to these savings, the process results in lower repair costs for the air preheater and in a profit which is due to an improved reliability of operation of the entire plant.

What is claimed is:

1. Process for supplying heat to the steam reforming of hydrocarbons for producing gas, which comprises combusting fuels with preheated combustion air, extracting sensible heat from the flue gases produced by said combustion in an air preheater for preheating said combustion air, said flue gases containing oxides of sulfur, cooling the hot reaction products of said reforming reaction in several cooling stages, air cooling being the last cooling stage of at least part of said reaction products which enter said last cooling stage at a temperature of about 80° – 170°C, the resulting cooling air at temperatures of about 50° – 120°C being at least in part withdrawn and passed through said air preheater to produce said preheated combustion air without cooling said flue gases below their dew point in said air preheater.

2. Process of claim 1 wherein the combustion air is heated in the air preheater to temperatures of about 120°–350°C.

* * * * *

UNITED STATES PATENT AND TRADEMARK OFFICE
CERTIFICATE OF CORRECTION

PATENT NO. : 3,980,452
DATED : 9/14/76
INVENTOR(S) : Hagen Krumm et al

It is certified that error appears in the above—identified patent and that said Letters Patent are hereby corrected as shown below:

Column 3, line 9 - after '50°-120' "Z" should be deleted and should read --50°-120° C--

Column 4, line 9 - after 'required to' "process" should be deleted and should be replaced with --burn--

Signed and Sealed this

Seventeenth Day of May 1977

[SEAL]

Attest:

RUTH C. MASON
Attesting Officer

C. MARSHALL DANN
Commissioner of Patents and Trademarks